(12) United States Patent
Bauer et al.

(10) Patent No.: US 10,097,680 B2
(45) Date of Patent: Oct. 9, 2018

(54) TRAINABLE TRANSCEIVER MODULE

(71) Applicant: Gentex Corporation, Zeeland, MI (US)

(72) Inventors: Frederick T. Bauer, Holland, MI (US); Robert R. Turnbull, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 386 days.

(21) Appl. No.: 14/529,666

(22) Filed: Oct. 31, 2014

(65) Prior Publication Data

US 2015/0126178 A1    May 7, 2015

Related U.S. Application Data

(60) Provisional application No. 61/898,651, filed on Nov. 1, 2013, provisional application No. 62/001,119, filed on May 21, 2014.

(51) Int. Cl.
| | | |
|---|---|---|
| *H04W 4/16* | (2009.01) | |
| *H04M 1/725* | (2006.01) | |
| *H02J 7/35* | (2006.01) | |
| *H04B 1/3822* | (2015.01) | |

(52) U.S. Cl.
CPC ........... *H04M 1/72533* (2013.01); *H02J 7/35* (2013.01); *H04W 4/16* (2013.01); *H04B 1/3822* (2013.01); *Y02B 10/14* (2013.01)

(58) Field of Classification Search
CPC .............................. H04M 1/72533; H02J 7/35
See application file for complete search history.

(56) References Cited

U.S. PATENT DOCUMENTS

| | | | | |
|---|---|---|---|---|
| 5,457,447 A | * | 10/1995 | Ghaem ................ | H04B 1/1607 322/2 R |
| 6,441,298 B1 | * | 8/2002 | Thio ............... | H01L 31/022425 136/246 |
| 2002/0003571 A1 | * | 1/2002 | Schofield ................ | B60C 23/00 348/148 |
| 2003/0214395 A1 | | 11/2003 | Flowerday et al. | |
| 2006/0232376 A1 | * | 10/2006 | Blaker ..................... | B60R 25/24 340/5.22 |
| 2009/0045978 A1 | * | 2/2009 | Weitzhandler ......... | G06Q 30/06 340/933 |
| 2010/0134240 A1 | * | 6/2010 | Sims ...................... | G08C 17/02 340/5.1 |
| 2010/0231528 A1 | * | 9/2010 | Wolfe ................... | G06F 3/0412 345/173 |
| 2010/0274483 A1 | * | 10/2010 | Wikel ................ | G01C 21/3667 701/469 |

(Continued)

FOREIGN PATENT DOCUMENTS

| | | |
|---|---|---|
| CN | 102290477 | 12/2011 |
| WO | WO 2011/097474 A1 | 11/2011 |

OTHER PUBLICATIONS

PCT Int'l App. No. PCT/US2014/063376 filed Oct. 31, 2014, dated Jan. 28, 2015—International Search Report and Written Opinion.

*Primary Examiner* — Muthuswamy Manoharan
(74) *Attorney, Agent, or Firm* — Price Heneveld LLP; Bradley D. Johnson

(57) ABSTRACT

A trainable transceiver module for operating a home operating system includes a housing, a photovoltaic unit supported by the housing and accessible to sunlight, a rechargeable power source, a trainable transceiver, and a one or more activation switches.

18 Claims, 2 Drawing Sheets

(56) References Cited

U.S. PATENT DOCUMENTS

2013/0173087 A1    7/2013  Mitchell et al.
2014/0021903 A1*   1/2014  Seiling .................. H02J 7/0042
                                                        320/101

* cited by examiner

TRAINABLE TRANSCEIVER MODULE

This application claims the benefit of U.S. Provisional Application Nos. 61/898,651 and 62/001,119 filed on Nov. 1, 2013 and Mar. 21, 2014, respectively. The entire contents of the above-identified provisional applications are incorporated herein by reference.

TECHNICAL FIELD

The technical field of this disclosure relates generally to a module that incorporates a trainable transceiver for syncing and wirelessly communicating with a home operating system.

BACKGROUND

Many vehicles are now outfitted with the capability to wirelessly communicate with a home operating system. One or more buttons are typically integrated into a fold-down visor, a rearview mirror, or an overhead counsel. These buttons interface with a trainable radio frequency (RF) transceiver and, when any one of them is pressed, a RF signal is transmitted for recognition by the home operating system. The RF signal associated with each button is a rolling code that activates the home operating system to perform some action—such as signaling a garage door operating system to open the door, close the door, lock the door, turn on/off a light, etc.

SUMMARY

A trainable transceiver module for operating a home operating system is disclosed. The trainable transceiver module includes a housing, a photovoltaic unit supported by the housing and accessible to sunlight, a rechargeable power source, a trainable transceiver, and a one or more activation switches. The photovoltaic unit and the rechargeable power source provide the trainable transceiver with a self-sufficient power source and, consequently, do not require the module to be hardwired into the electronic operating system of the vehicle or to draw power from the vehicle. The trainable transceiver module can therefore be installed on any type of vehicle even if that vehicle has not been manufactured with wireless communication capabilities. Several examples of the home operating system can be synced with and controlled by the trainable transceiver module are a garage door operating system, a home security system, a home security gate, or a home lighting system.

DETAILED DESCRIPTION

At least one embodiment of the trainable transceiver module is described in detail here with respect to a garage door operating system. The module, referred to in this instance as trainable garage door control module 10, can be synced for communication with the garage door operating system and, once synced, can wirelessly activate the system to perform certain intended functions. And although not expressly described in further detail here, skilled artisans will appreciate that the trainable transceiver module could similarly be used in conjunction with other home operating systems besides the garage door operating system specifically referred to here.

Figure 1:
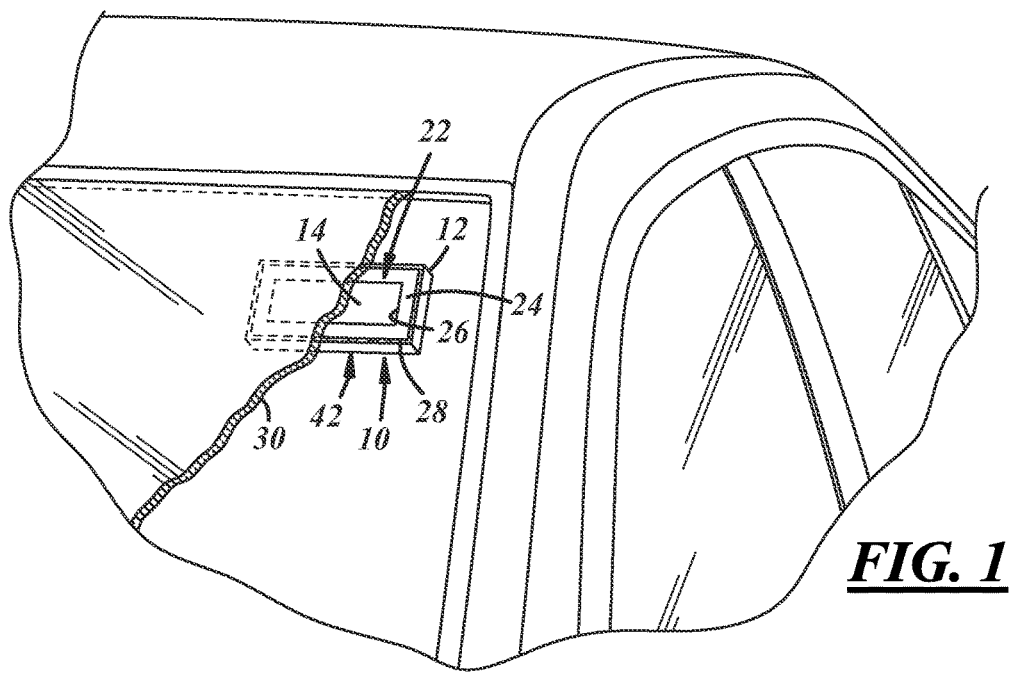
FIG. 1 is a perspective view of at least one embodiment of the trainable transceiver module from outside of the vehicle in which the module is affixed to a windshield surface (partially broken away) of the vehicle.
Figure 2:
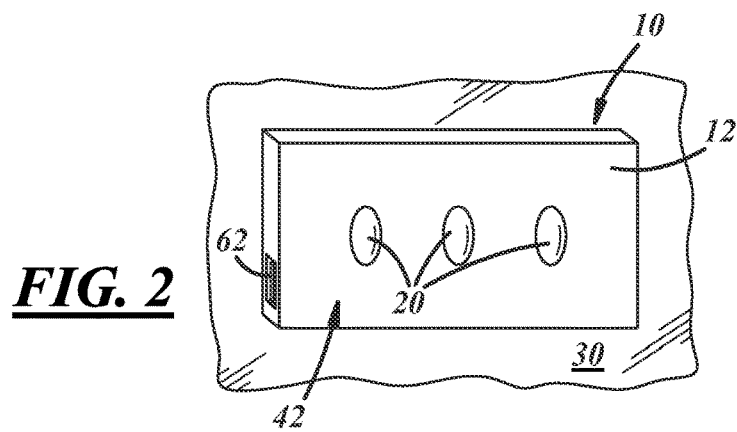
FIG. 2 is a perspective view of the trainable transceiver module depicted in FIG. 1 from inside the vehicle.
Figure 3:
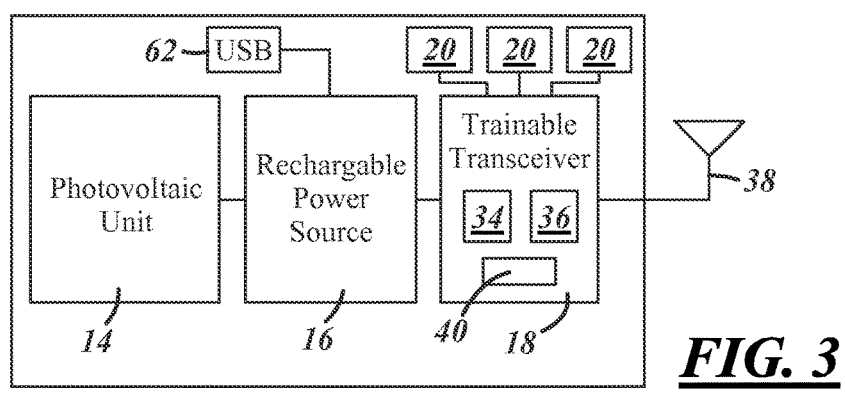
FIG. 3 is a schematic illustration of components of the trainable transceiver module depicted in FIGS. 1-2.

The trainable garage door control module 10 that can be installed on a vehicle is illustrated in FIGS. 1-3. The module 10 is self-sufficient in that it does not have to be hardwired into the electronic control system or other network during manufacturing of the vehicle. Such autonomy allows the module 10 to be installed in any type of vehicle, at any time, and does not necessarily require the vehicle to have been manufactured with the capability to support wireless communication devices. The module 10 can include a housing 12, a photovoltaic unit 14, a rechargeable power source 16, a trainable transceiver 18, and one or more activation switches 20. Circuitry is employed where needed—such as boost converters, charge pumps, voltage dividers and detectors, signal guards, etc.—to electrically connect the components 14, 16, 18, 20 within the housing 12 and to enable them to interface and operate together as will be appreciated by those skilled in the art. The trainable garage door control module 10 can be used to operate a garage door operating system.

The housing 12 provides a structural package for the components 14, 16, 18, 20 of the module 10 and can be made out of a plastic such as acrylonitrile butadiene styrene (ABS). A mounting portion 22 of the housing 12 includes a peripheral rim 24 that defines a window 26. An adhesive band 28 is disposed on the peripheral rim 24 to affix the housing 12 to an interior windshield surface 30 or some other sunlight-transmissible surface of the vehicle. The adhesive band 28 can be a curable glue. Some examples of a suitable curable glue are an acrylic glue, a polyurethane glue, and an epoxy glue. The adhesive band 28 does not have to be a curable glue, however, as it could also be double-sided adhesive tape or another glass binding component. It will further be appreciated that the adhesive band 28 may be disposed on other locations of the mounting portion 22 and in any suitable configuration.

The photovoltaic unit 14 includes one or more photovoltaic cells that include an n-type semiconductor and a p-type semiconductor that cooperate to establish a p-n junction. The photovoltaic cell(s) is preferably a thin-film p-i-n cell that includes—in order from a sun-up side to a back side—a transparent substrate such as glass, an antireflective coating such as silicon nitride or titanium oxide, a p-type (e.g., boron doped) amorphous silicon film, an intrinsic (i-type or undoped) amorphous silicon film, and an n-type (e.g., phosphorous doped) amorphous silicon film. Electrical contacts are associated with the p-type and the n-type amorphous silicon films and electrically communicate with an external circuit that carries a direct current produced by the photovoltaic cell.

Other types of photovoltaic cells could also be used besides the p-i-n thin-film cell just described. For example, the sequence of the p-type amorphous silicon film and the n-type amorphous silicon film could be switched, if desired, to provide the thin-film cell with an n-i-p configuration. Thin-film cells based on other semiconductor materials could also be used including a cadmium telluride (CdTe) cell or a copper indium gallium selenide (CIGS) cell. A monocrystalline or a polycrystalline silicon wafer could also be doped to provide both the n-type semiconductor (sun-up side) and the p-type semiconductor (back-side) as an alternative to thin-film cell technology. Another example is a transparent photovoltaic cell such as, but not limited to, a heterojunction organic photovoltaic (OPV) cell, demonstrating peak-absorption in the ultraviolet (UV and/or near-infrared (NIR)). Other suitable photovoltaic cells not specifically mentioned here may also be used.

The photovoltaic unit 14 may be comprised, in one particular example, of up to four monocrystalline high-efficiency photovoltaic cells that have a spectral sensitivity range which includes visible light (the visible light ranges is about 390 nm to about 700 nm on the electromagnetic spectrum). Photovoltaic cells of this kind can be obtained, for example, from IXYS Corporation (Santa Clara, Calif.) under the part number KXOB22-04X3. This particular photovoltaic cell is suitable for the module 10 on account of its power conversion efficiency of about 15% to about 22% and its ability to operate in low-light conditions such as overcast skies.

The photovoltaic unit 14 is supported by the housing 12 so that sunlight can impinge upon the unit 14 through the window 26. In this way, for each photovoltaic cell that is employed in the photovoltaic unit 14, available sunlight can pass through the transparent substrate and the antireflective coating, and act on the n-type and the p-type semiconductors. The sunlight dislodges electrons within the n-type semiconductor. Those electrons are then carried through the external circuit around the p-n junction to fill holes in the p-type semiconductor. The direct current produced by the flow of electrons can be used to power the trainable garage door control module 10 independent from the vehicle battery or other power source integrated into the vehicle.

The rechargeable power source 16 is charged by the photovoltaic cell 14 and includes a positive terminal and a negative terminal. The rechargeable power source 16 is electrically connected to the photovoltaic cell 14 so that the voltage created across the p-n junction—when sunlight is acting on the n-type and the p-type semiconductors—drives non-spontaneous electrochemical activity between the electrodes associated with each terminal to re-store capacity. The rechargeable power source 16 is also electrically connected to the trainable transceiver 18 to provide power to the transceiver 18 when needed. Additionally, a Schottky diode may be connected to the rechargeable power source 16 to prevent the rechargeable power source 16 from discharging through the photovoltaic unit 14 in low-light conditions.

The rechargeable power source 16 may be a single secondary (i.e., rechargeable) battery or, if needed, an arrangement of multiple secondary batteries connected in series or in parallel. Any kind of secondary battery that has a sufficient capacity and terminal voltage may be used in the rechargeable power source 16 to power the trainable transceiver 18. Some examples of suitable secondary batteries are a lithium-ion battery, a lithium-ion polymer battery, a nickel-cadmium battery, and a nickel metal hydride battery, to name but a few. In one particular example, the rechargeable power source 16 may include two 1.2V nickel metal hydride (NMH) secondary coin batteries, each of which has a nominal capacity of about 65 mA·h. Such NMH secondary batteries can be obtained from Varta Microbattery GmbH (Ellwangen, Germany).

The trainable transceiver 18 includes both a transmitter 34 and a receiver 36 that can sync and wirelessly communicate with a garage door operating system by way of a RF antenna 38. To train the trainable transceiver 18, an activation signal from an original transmitter, like a key fob or a garage door remote or the garage door operating system itself, can be transmitted within the vicinity of the transceiver 18 while the transceiver 18 is undergoing a programmed training sequence. During that time, the trainable transceiver 18 learns the operating data (frequency, rolling code, control data, etc.) of the operating system and stores it for later re-transmission as a recognizable RF signal. A micro-controller 40 or other processing device is typically associated with the trainable transceiver 18 to manage its operation. While a number of trainable transceivers are commercially available for use in the trainable garage door control module 10, the device used here can be a HomeLink® trainable transceiver that is constructed, for example, according to any of U.S. Pat. Nos. 5,614,891, 5,708,415, 5,854,593, or 6,091,343.

The one or more activation switches 20 are accessible outside of the housing 12 at a user interface portion 42 that faces the vehicle interior for easy access. Each of the activation switches 20 is configured to communicate with the trainable transceiver 18 and is associated with the transmission of a particular RF signal from the RF antenna 38 of the transceiver 18 when actuated by a user. For example, actuating one activation switch 20 may transmit a RF signal that activates the garage door operating system to open/close the garage door while actuating another switch 20 may transmit a RF signal that activates the garage door operating system to turn an interior light on/off. Simultaneously actuating multiple switches 20 may also transmit a RF signal that is different from the RF signal transmitted by actuating any one button by itself. The mechanism by which the one or more activation switches 20 communicate with and control RF signal transmission from the trainable transceiver 18 can be any known type.

The activation switches 20 may be interactive features that allow a user to selectively command the trainable transceiver 18 to transmit the desired RF signal. For example, as shown in FIG. 2, the activation switches 20 may be depressible buttons that, when pressed, initiate transmission of the RF signal associated with that particular button or group of buttons. As another example, the activation switches 20 may be capacitive sense interfaces that are touch-responsive. In this way, a user initiates transmission of the RF signal associated with one or a group of activation switches 20 by simply touching a designated area.

Figure 5:
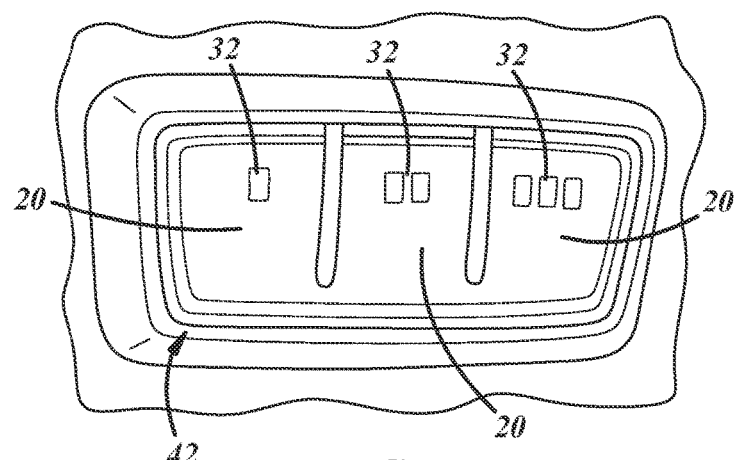
FIG. 5 is a perspective view of an embodiment of the trainable transceiver module that includes LED lights.

In order to help a user locate the activation switches 20—and regardless of whether the activation switches 20 employ buttons or touch-responsive capacitive sense interfaces or something else—one or more LED lights 32 may be visible at the user interface portion 42 of the housing 12 in the vicinity of each activation switch 20, as shown in FIG. 5. These LED lights 32 are electrically connected to the rechargeable power source 16. They may also be illuminated intermittently by capacitive proximity sensing to preserve the capacity of the rechargeable power source 16 as much as possible. Capacitive proximity sensing, in general, would only illuminate the LED lights 32 when a finger or hand or other object is brought into a predetermined proximity of the user interface portion 42 of the housing 12. Any type of sensor or sensors that can achieve the desired capacitive proximity sensing function may be used.

The module 10, moreover, may optionally include a USB port 62 (FIG. 2) accessible at the housing 12. The USB port 62 can electrically communicate with, and thus supply current to, the rechargeable power source 16 in the event that sunlight is not available for whatever reason. For example, if the vehicle has been stored in the dark for an extended period of time and the capacity of the rechargeable power source 16 has been depleted, the USB port 62 provides the option to connect the rechargeable power source 16 to the vehicle battery by way of a known power cord (not shown) to quickly recharge the power source 16 and allow the trainable transceiver 18 to function until sunlight becomes available. As another example, the USB port 62 may allow a user to charge and operate the module 10 once the module 10 has been removed from retail packaging but prior to installation on the vehicle and associated sunlight-based charging. The USB port 60 could also be used to provide the trainable transceiver 18 with firmware updates, if desired.

Figure 4:
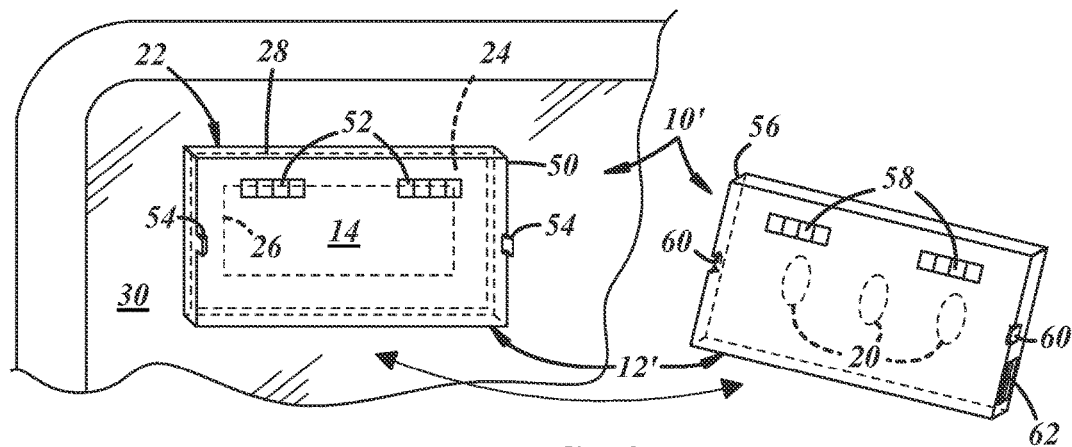
FIG. 4 is an exploded perspective view of at least one embodiment of the trainable transceiver module in which the module has a separable two-part housing.

At least one embodiment of the trainable garage door control module 10' is illustrated in FIG. 4. The trainable garage door control module 10' shown here is accommodated in a separable two-piece housing 12' that includes a first part 50 and a second part 56. The first part 50 of the housing 12' has the mounting portion 22 described above and contains the photovoltaic unit 14. The mounting portion 22, like before, includes the peripheral rim 24 that defines the window 26, and the adhesive band 28 disposed on the peripheral rim 24 affixes the first part 50 of the housing 12' to the interior windshield surface 30 or some other sunlight-transmissible surface of the vehicle. The first portion 50 further includes one or more electrical contacts 52 and an attachment feature 54. The attachment feature 54 may be a pair of flexible legs each having an inward shoulder, as shown, or it may be a magnet, retractable pin(s), or some other structural component that can effectuate a releasable attachment.

The second part 56 of the housing 12' contains the rechargeable power source 16, the trainable transceiver 18, and the one or more activation switches 20, and further includes one or more electrical contacts 58 and an attachment feature 60. The one or more electrical contacts 58 are located on the second part 56 to achieve facing alignment and electrical contacting engagement with the electrical contacts 52 on the first part 50 when the two parts 50, 56 are attached together to make the housing 12'. Such contacting engagement of the electrical contacts 52, 58 reunites the photovoltaic unit 14 contained in the first part 50 with the several components 16, 18, 20 contained in the second part 56 and permits them to function cooperatively. As for the attachment feature 60 included on the second part 56 of the housing 12', it may be a pair of depressions sized to receive the inward shoulder of the flexible legs that extend from the first part 50, as shown, or it may be some other structural component that cooperates with the attachment feature 54 of the first part 50 to releasably attach the two parts 50, 52 together.

The first and second parts 50, 56 of the housing 12' are releasably attached by way of their respective attachment features 54, 60. The ability to separate the first and second parts 50, 56 makes it possible to remove the trainable transceiver 18 from the windshield surface 30 and to use it away from the vehicle as long as the rechargeable power source 16 has sufficient capacity. When the rechargeable power source 16 is no longer able to power the trainable transceiver 18, the second part 56 can simply be attached to the first part 50 to recharge the power source 16 with the photovoltaic unit 14, or it may be powered independently through the USB port 60 which, as shown here, may be located in the second part 56 of the housing 12'. The ability to separate the first and second parts 50, 56 can also help prevent unauthorized use of the trainable garage door control module 10' by allowing the trainable receiver 18 to be removed from the vehicle and secured elsewhere.

In use, the trainable garage door control module 10, 10' is affixed to the windshield surface 30 of the vehicle so that the window 26 of the housing 12, 12' is facing out of the vehicle and is accessible to sunlight. The module 10, 10' is affixed to the windshield surface 30 by contacting the adhesive band 28 disposed on the peripheral rim 24 of the housing 12, 12' to the windshield surface 30. Affixing the module 10, 10' to the windshield surface 30 in this way ensures that adequate sunlight can reach and impinge upon the photovoltaic unit 14, which in turn ensures that the rechargeable power source 16 contains sufficient capacity to operate the trainable transceiver 18 during training and periodic user engagement of the one or more activation switches 20 as well as the LED lights 32, if present.

After being trained to operate the garage door operating system, which may be performed before or after the module 10, 10' is affixed to the windshield surface 30, a user can actuate any single activation switch 20 or a combination of activation switches 20 to activate the garage door operating system and cause it to perform the function assigned to that switch or switches. The LED lights 32, if present, help a user locate the desired switches 20—especially during night-time driving—by illuminating when a hand, finger, or other object is brought near the module 10, 10'. Once the designated switch(s) 20 are actuated, the trainable transceiver 18 draws power from the rechargeable power source 16 and transmits the assigned RF signal from the RF antenna 38. The RF signal is received and deciphered by the garage door operating system, and the desired function is carried out. The rechargeable power source 16 is then recharged by the photovoltaic unit 14 when useable light is available to maintain operability of the trainable transceiver 18, or it can be recharged through the USB port 62 if one is present.

The trainable garage door control module 10, 10' has a self-sufficient and optionally rechargeable power source. There is no need to hardwire the trainable garage door control module 10, 10' into the electronic control system of the vehicle to provide power and information to the module 10, 10'. This autonomy allows the trainable garage door control module 10, 10' to be used in conjunction with any type of vehicle without regard for the wireless communication capabilities manufactured into the vehicle. It also allows the trainable transceiver 18 to be separated from the vehicle in certain designs of the module 10' whenever such detachment is desired. Other benefits may also be realized through the construction of the trainable garage door control module 10, 10'.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A trainable transceiver module comprising:
a housing;
a photovoltaic unit supported by the housing and accessible to sunlight;
a rechargeable power source electrically connected to the photovoltaic unit;
a trainable transceiver electrically connected to the rechargeable power source, the trainable transceiver including a transmitter and a receiver that can each communicate with a home operating system by way of a radio frequency (RF) antenna; and one or more activation switches that communicate with the trainable transceiver to transmit radio frequency signals from the RF antenna;

wherein the housing comprises a first part that contains the photovoltaic unit and a second part that is releasably attachable to the first part, the second part of the housing containing the rechargeable power source, the trainable transceiver, and the one or more activation switches.

2. The trainable transceiver module set forth in claim 1, wherein the rechargeable power source includes one or more nickel metal hydride batteries.

3. The trainable transceiver module set forth in claim 1, wherein the photovoltaic unit includes one or more photovoltaic cells that include an n-type semiconductor and a p-type semiconductor that cooperate to establish a p-n junction.

4. The trainable transceiver module set forth in claim 1, wherein the photovoltaic unit comprises at least one monocrystalline photovoltaic cell having a spectral sensitivity range which includes visible light.

5. The trainable transceiver module set forth in claim 1, wherein the one or more activation switches includes one or more buttons or one or more touch-responsive capacitive sense interfaces.

6. The trainable transceiver module set forth in claim 1, further comprising:
one or more LED lights visible through the housing in the vicinity of the one or more activation switches, the LED light(s) being electrically connected to the rechargeable power source and further being intermittently illuminated by capacitive proximity sensing.

7. The trainable transceiver module set forth in claim 1, wherein the housing further comprises a USB port.

8. The trainable transceiver module set forth in claim 1, wherein the housing comprises a mounting portion mountable to an interior windshield surface of a vehicle.

9. The trainable transceiver module set forth in claim 8, wherein the mounting portion includes a peripheral rim that defines a window through which sunlight can impinge the photovoltaic unit, the peripheral rim comprising an adhesive band that affixes the housing to the interior windshield surface.

10. A trainable transceiver module comprising:
a housing having a mounting portion and a user interface portion, the mounting portion being mountable to an interior windshield surface of a vehicle and the user interface portion being oriented to face an interior of the vehicle, the mounting portion including a peripheral rim that defines a window accessible to sunlight, the peripheral rim further comprising an adhesive band that affixes the housing to the interior windshield surface;
a photovoltaic unit supported by the housing so that sunlight that passes through the windshield surface of the vehicle and through the window of the mounting portion of the housing can impinge the photovoltaic unit and thereby generate an electric current;
a rechargeable power source electrically connected to the photovoltaic unit and configured to be re-charged by the electric current generated by the photovoltaic unit;
a trainable transceiver electrically connected to the rechargeable power source, the trainable transceiver including a transmitter and a receiver that can each communicate with a home operating system by way of a radio frequency (RF) antenna; and
one or more activation switches accessible at the user interface portion that communicate with the trainable transceiver to transmit radio frequency signals from the RF antenna.

11. The trainable transceiver module set forth in claim 10, further comprising:
one or more LED lights visible through the housing in the vicinity of the one or more activation switches, the LED light(s) being electrically connected to the rechargeable power source and further being intermittently illuminated by capacitive proximity sensing.

12. The trainable transceiver module set forth in claim 10, wherein the housing comprises:
a first part that contains the photovoltaic unit; and
a second part that is releasably attachable to the first part, the second part of the housing containing the rechargeable power source, the trainable receiver, and the one or more activation switches;
wherein each of the first part of the housing and the second part of the housing includes one or more electrical contacts that contact and electrically engage when the first and second parts of the housing are attached in order to permit the photovoltaic unit in the first part to electrically communicate with at least the rechargeable power source in the second part.

13. The trainable transceiver module set forth in claim 10, wherein the housing further comprises a USB port that electrically communicates with at least the rechargeable power source so that the USB port can supply current to, and thus recharge, the rechargeable power source.

14. The trainable transceiver module set forth in claim 10, wherein the rechargeable power source includes one or more nickel metal hydride batteries.

15. The trainable transceiver module set forth in claim 10, wherein the photovoltaic unit comprises at least one monocrystalline photovoltaic cell having a spectral sensitivity range which includes visible light.

16. The trainable transceiver module set forth in claim 10, wherein the one or more activation switches includes one or more buttons.

17. A trainable transceiver module comprising:
a housing having a mounting portion, the mounting portion being mountable to an interior windshield surface of a vehicle and having a window that is accessible to sunlight;
a photovoltaic unit supported by the housing and accessible to sunlight that passes through the windshield surface of the vehicle;
a rechargeable power source electrically connected to the photovoltaic unit and configured to be re-charged by electric current generated by the photovoltaic unit when exposed to sunlight;
a trainable transceiver electrically connected to the rechargeable power source, the trainable transceiver including a transmitter and a receiver that can each communicate with a home operating system by way of a radio frequency (RF) antenna;
one or more activation switches that communicate with the trainable transceiver to transmit radio frequency signals from the RF antenna; and
one or more LED lights visible through the housing in the vicinity of the one or more activation switches, the LED light(s) being electrically connected to the rechargeable power source and further being intermittently illuminated by capacitive proximity sensing;
wherein the trainable transceiver module is not hardwired into an electronic control system of the vehicle and therefore does not receive power or instructions from the electronic control system.

18. The trainable transceiver module set forth in claim 17, wherein the housing further comprises a USB port that electrically communicates with at least the rechargeable power source so that the USB port can supply current to, and thus recharge, the rechargeable power source.

\* \* \* \* \*